United States Patent [19]

Kraft et al.

[11] 4,240,938

[45] Dec. 23, 1980

[54] WATER-SOLUBLE REACTIVE POLYMER MIXTURE

[75] Inventors: Kurt Kraft; Gerd Walz, both of Wiesbaden; Thaddäus Wirth, Heidenrod; Ernst-August Theiling, Hofheim, all of Fed. Rep. of Germany

[73] Assignee: Hoechst Aktiengesellschaft, Frankfurt, Fed. Rep. of Germany

[21] Appl. No.: 21,566

[22] Filed: Mar. 16, 1979

[30] Foreign Application Priority Data

Mar. 18, 1978 [DE] Fed. Rep. of Germany ....... 2811913
Dec. 12, 1978 [DE] Fed. Rep. of Germany ....... 2851962

[51] Int. Cl.³ .................... C08G 85/00; C09J 3/12; C09J 3/14
[52] U.S. Cl. ..................... 260/18 EP; 260/22 EP; 260/29.2 EP; 260/29.2 E; 428/414; 428/480; 428/482; 525/119; 525/121; 525/419; 525/508; 525/530; 525/533; 528/112; 528/302; 528/305; 528/306; 528/308; 528/361; 528/365
[58] Field of Search ....... 260/18 EP, 22 EP, 29.2 EP, 260/29.2 E; 525/419, 119, 121, 508, 530, 533; 528/112, 361, 365, 302, 305, 306, 308; 428/414, 480, 482

[56] References Cited

U.S. PATENT DOCUMENTS

| | | | |
|---|---|---|---|
| 3,300,424 | 1/1967 | Hoenel et al. | 260/22 M |
| 3,434,987 | 3/1969 | Dhein et al. | 260/21 |
| 3,440,192 | 4/1969 | Hoy et al. | 260/22 EP |
| 3,563,929 | 2/1971 | Guldenpfennig | 260/22 EP |
| 3,720,648 | 3/1973 | Guldenpfennig | 525/533 |
| 3,730,926 | 5/1973 | Guldenpfennig | 260/22 EP |
| 3,847,851 | 11/1974 | Tugukuni et al. | 260/22 CB |
| 3,891,633 | 6/1975 | Berlin et al. | 528/112 |
| 3,933,862 | 1/1976 | Williams | 528/112 |
| 3,954,712 | 5/1976 | Lottanti et al. | 525/530 |
| 4,002,599 | 1/1977 | Graham | 525/530 |
| 4,007,079 | 2/1977 | Turley et al. | 260/18 EP |
| 4,017,453 | 4/1977 | Heilman et al. | 525/530 |
| 4,054,614 | 10/1977 | Hoffman | 260/29.2 E |
| 4,098,735 | 7/1978 | Tobias | 260/22 EP |
| 4,101,516 | 7/1978 | Barie et al. | 528/112 |
| 4,116,903 | 9/1978 | Lietz et al. | 260/22 CB |
| 4,128,515 | 12/1978 | Tobias et al. | 260/18 EP |
| 4,172,822 | 10/1979 | Patzschke | 525/419 |

*Primary Examiner*—Ronald W. Griffin
*Attorney, Agent, or Firm*—Quaintance, Murphy & Richardson

[57] ABSTRACT

A water-soluble reactive binder, characterized by a combination of at least three of the components
 (a) at least one halogen-free polycarboxylic acid compound;
 (b) at least one salt-forming substance selected from the group consisting of alkali metal, alkaline earth metal and quaternary ammonium salts, organic bases and ammonia;
 (c) at least one component selected from the group consisting of
  (c1) a polymer containing OH groups; and
  (c2) an epoxide compound, wherein the components (a) to (c2) are present as such or at least partially in chemically bonded form, a process for its preparation, an article coated with said binder and an adhesive containing said binder.

10 Claims, No Drawings

WATER-SOLUBLE REACTIVE POLYMER MIXTURE

It is known that aqueous gloss coating dispersions have a number of shortcomings, e.g. a loss of gloss when they contain an amount of pigment of 50% or more by weight. In such cases it is impossible to obtain a high gloss, and in addition the flow qualities are unsatisfactory and the dried films have a tendency to block owing to their thermoplasticity. The deficiencies in gloss may be reduced by adding substantial amounts of water-soluble solvents such as ethylene glycol monoalkyl- or -butyl ether, but this makes the aqueous systems less acceptable to the environment. Another disadvantage is the presence of considerable amounts of emulsifiers in the dispersions. This leads to a reduction in the resistance of the films to weathering, water, solvents and alkalis.

It is also known that aqueous stoving dispersions, like water-soluble synthetic resins, also have considerable disadvantages. Thus, in layer thicknesses of more than 30–40 μm, they have a tendency to form craters. The saline spray test (according to ASTM) on coatings formed from these dispersions and their waterproofing qualities are unsatisfactory. When used for coating vertical surfaces, their flow qualities are inadequate. Frequently, in water-soluble systems, anomalies in viscosity are observed, which can be very detrimental. Moreover, many of these systems contain large amounts of organic solvents for stabilisation purposes. If such systems are diluted with water to a working viscosity, they then have only a short shelf life. Then phase separation and flocculation, and even gel formation occurs.

It is also known to react halogenated dicarboxylic acids with epoxidised oils at room temperature, with curing. However, this process has the disadvantage that the acids cannot be used in a high enough concentration, as they crystallise out of the system.

Coating compositions are also known, based on alkyd resins reacted with halogenated dicarboxylic acids or the anhydrides thereof, an epoxidised oil and tert.-amines. The halogen content is intended to increase the acidity of the dicarboxylic acids or anhydrides in order to permit curing at low temperatures. Owing to the presence of the halogenated dicarboxylic components, these systems have the above-mentioned disadvantages and in particular an inadequate resistance to light.

It is also known that it is possible to improve the adhesive strength of adhesives dispersed in water and containing elastomeric or acrylate-containing binders, which are adhesive when applied to two surfaces which are to be bonded together and the water is evaporated off and the parts to be bonded are placed together and briefly pressed against each other, by adding suitable resins dispersed in water to the adhesive mixture.

Adhesives of this kind are generally known as contact adhesives.

To improve the adhesive strength of these contact adhesives, various resins have been hitherto used, such as phenol-formaldehyde resins, colophony, cumarone-/indene, terpene, cyclopentadiene resins or resins obtained from other unsaturated hydrocarbons, either alone or in combination.

A characteristic of all these resins is that they first have to be emulsified or dispersed in water before being combined with the aqueous elastomeric or acrylate component using suitable adjuvants. In addition, they cannot react further or cross-link, either with themselves or with the elastomeric or acrylate component, once the emulsion or dispersion has been produced, as they lack the necessary chemical groups.

These disadvantages are also the reason why the adhesive strength is not increased greatly by the incorporation of the resins used hitherto, particularly at elevated temperatures. In fact, the effect of these resins is primarily to increase the tackiness of the binder component. When pressure is applied, this results in a purely physical, increased bonding of the individual molecules of the elastomeric or acrylate components to one another.

This invention overcomes these disadvantages by providing a water-soluble reactive binder which is characterised by a combination of at least three of the components (a) one or more halogen-free polycarboxylic acid compounds;

(b) one or more salt-forming substances selected from alkali metal, alkaline earth metal and quaternary ammonium salts, organic bases and/or ammonia; and (c1) one or more polymers containing OH groups, and/or (c2) one or more epoxide compounds, components (a) to (c2) being present as such or at least partly in chemically bonded form.

Surprisingly, it has been found that the binders according to the invention, even when they do not contain halogen, harden at low temperatures, e.g. at room temperature, and are also extremely fast to light. Conveniently, the binder is present in the form of an aqueous solution. The polycarboxylic acid component (a) is preferably at least partially reacted with component (b), i.e. component (a) is preferably present partially or totally in the form of a salt.

According to one embodiment of the invention, the binder according to the invention, particularly when used for adhesives, contains at least one reaction product of formula

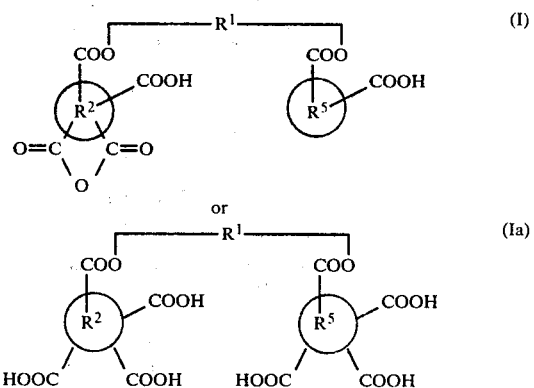

based on at least three of the components (a) to (c2). In these formulae, $R^1$ represents a group derived from at least one polymer containing OH groups, namely a polymerisation and/or condensation product selected from groups derived from polyesters and polymers, both having an OH number of 20 to 300, preferably 40 to 220, and phenolic resins with an OH number of 100 to 800, preferably 150 to 300 and/or $R^1$ represents a group derived from an epoxide compound; $R^2$ represents a group derived from an at least tetrabasic carboxylic acid with a COOH group in the o-position relative to the ester group; $R^5$ represents a group derived from an at least dibasic carboxylic acid with a COOH group in the o-position relative to the ester group, and $R^5$ may also have the same meaning as $R^2$; and the anhydride groups in formula (I) or (Ia) may be at least partially replaced by ester groups, and the free COOH groups are present in the form of a salt of component (b) in an amount of from 1 to 200%.

In addition to a reaction product of formula (I) or (Ia) the binder may also contain unreacted units of at least one of the components (a) to (c2). Depending on the amount of the components (a) to (c2) or the reaction products thereof, which may not have been formed or the formation of which may be partially or wholly completed, the binder according to the invention is present in the form of a one-component or multi-component system having the nature of a hydrosol.

The term "polycarboxylic acid compounds" should be taken to mean compounds which may contain free carboxyl, anhydride and/or ester groups, either alone or in combination.

Various system may be present as the groups $R^2$ and $R^5$ in formula (I) or (Ia). For example, $R^2$ and $R^5$, which may be the same or different, may represent a group of formula

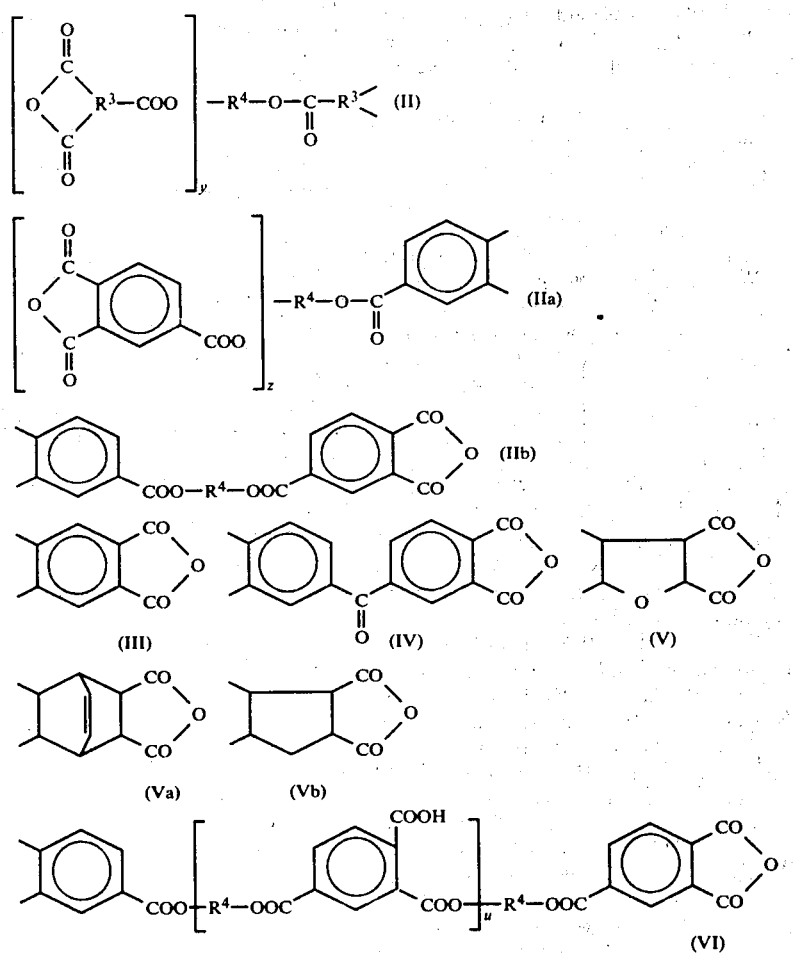

or the residue of an anhydride of formula

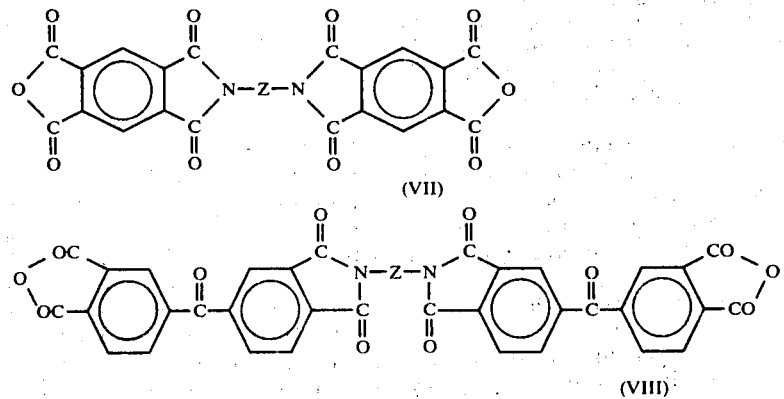

-continued

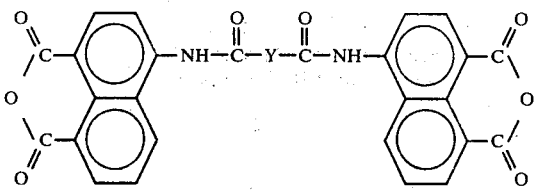
(XI)

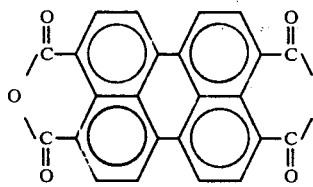
(XIII)

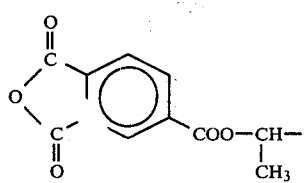
(XIV)

or

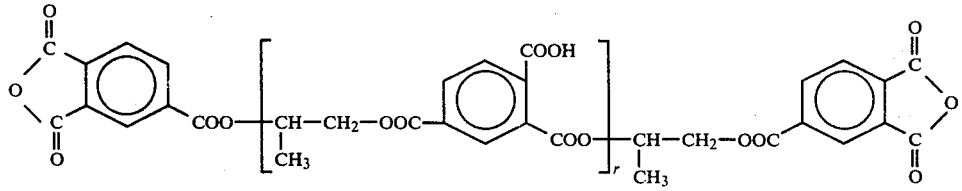
(XV)

In these formulae, the anhydride group bonded to the $R^2$ group present in formula (I) or (Ia) has been shown. In these formulae:

$R_3$ may represent a cyclic system based on benzene, naphthalene, phenanthrene, aminonaphthalene, bicyclooctene, cyclopentane and tetrahydrofuran;

$R^4$ represents a di to pentavalent aliphatic hydrocarbon group having from 1 to 20, advantageously 1 to 15, preferably 2 to 8 carbon atoms, (which may be optionally interrupted by at least one oxygen bridge or —HC≡CH— group, or optionally substituted by an ester group having from 1 to 6, preferably 1 to 3 carbon atoms or a COOH group), an aromatic group having from 6 to 43 carbon atoms of formula

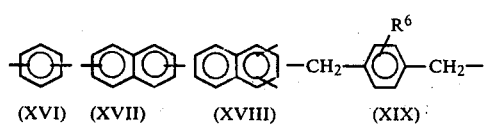
(XVI) (XVII) (XVIII) (XIX)

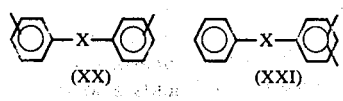
(XX) (XXI)

[wherein X represents a group of formula

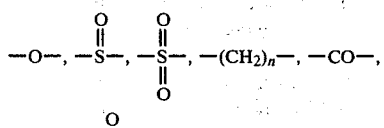

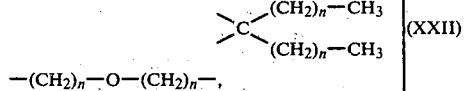

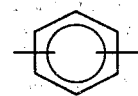
(XXII)

(in which n is from 1 to 8), and the aromatic nuclei may optionally be substituted by at least one group $R^6$ selected from halogen atoms, and alkyl and alkoxy groups each having from 1 to 6 carbon atoms], a piperazine group, or a group of formula

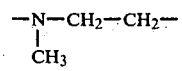
(XXIII)

or

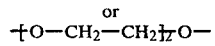
(XXIV)

Y represents a group of formula

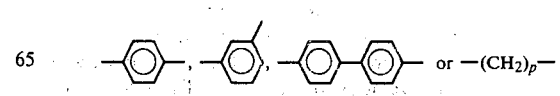

(in which p is from 2 to 8);

Z represents a group of formula —(CH₂)$_m$—(in which m is from 2 to 8); or of formula

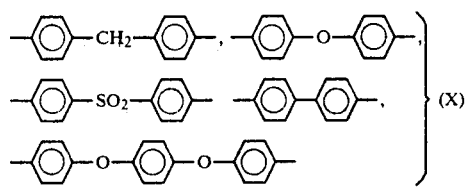

r and u are each from 1 to 8, preferably 1 to 4;
y is from 1 to 4, and
z is 1 or 2.
Examples of $R^4$ groups include —(CH₂)$_s$—

(wherein s is 2 to 10, preferably 2 to 4), $$-CH_2-CH-,\ -CH_2-CH=CH-CH_2-,$$
$$\phantom{-CH_2-}|\phantom{CH-}$$
$$\phantom{-CH_2-}CH_3$$
$$-CH_2-CH_2-O-CH_2-CH_2-,\ -CH_2-CH-CH_2-,$$

or a group of formula XXII as hereinbefore defined.

In addition, $R^5$ may also represent a group derived from a di- or tricarboxylic acid system, e.g. from trimellitic acid, phthalic acid, 4-amino-phthalic acid, endomethylenetetrahydrophthalic acid, hexa- and/or tetrahydrophthalic acid, naphthalic acid or 4-aminonaphthalic acid.

The binders according to the invention are unusually reactive. Even at 0° C. they undergo hardening, i.e. the formation of a polymeric network, by cross-linking.

The reaction products (I) and (Ia) may be prepared by reacting oligo- or polymeric compounds containing hydroxyl groups with bisanhydrides which contain a grouping according to one of formulae (II) to (VIII), (XI) and (XIII) to (XV). Suitable bisanhydrides include those of formula (III) to (VIII), (XI) and (XIII) to (XV) and also, for example, pyromellitic dianhydride, benzophenone tetracarboxylic dianhydride, naphthalenetetracarboxylic dianhydride, tetrahydrofurantetracarboxylic dianhydride, cyclopentanetetracarboxylic dianhydride, and the anhydrides of one of the formulae (II) and (IIa) as obtained, for example, by reacting trimellitic anhydride and/or the compound

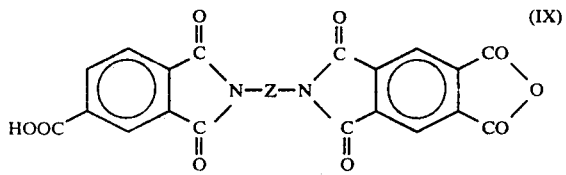

(wherein Z is as hereinbefore defined), the anhydrides according to formulae (II) to (VIII), (XI) and (XIII) to (XV) and/or other oligomeric bisanhydrides. If it is desired to obtain carboxylic acid components with free COOH or ester groups, it is advisable to hydrolyse or esterify the bisanhydrides at least partially before, during or after coupling them to the $R^1$ compounds or mixing them with compounds (c1) to (c2).

As a rule the reaction product (I) or (Ia) contains at least two COOH groups in the form of a salt and at least one ester group, so that molecules bonded to the $R^1$ group are present in the form of a partial ester, preferably the half ester, whilst the ester group may be present instead of or together with an anhydride group. Such ester groups may be esterified with for example monohydric alcohols such as methanol, ethanol, hexanol, octanol, lauryl alcohol, stearyl alcohol in the iso- or n-form. These partial esters may be used as such or in admixture with other carboxylic acid components. They are also excellent reaction partners for the epoxide compounds. However, if the components of the mixture are reacted with one another in a thin layer and in the presence of atmospheric moisture, the presence of free COOH groups in not absolutely necessary. In many cases, the salt groups in not absolutely necessary. In many cases, the salt groups or the carboxyl groups in the ortho-position to the ester group act as starters. They are bonded in the reaction to component (c2) via the oxirane rings thereof by the reaction (moisture being required for the reaction with salt groups), and liberate secondary hydroxyl groups which in turn, as a result of the reaction with the anhydride groups, liberate new carboxyl groups which react with other oxirane rings, thereby undergoing decyclisation. Thus, here again, the formation of a crpss-linked network occurs, which can take place under mild conditions, e.g. at 0° C. according to one embodiment of the invention.

If the binder according to the invention is present in the form of a mixture, generally there is first prepared a stable mixture of epoxide component (c2) and/or component (c1), which contains OH groups, and shortly before treatment the acid units (a) of formulae (II) to (VIII) and (XI) to (XV) or the reactive derivatives thereof, which act as the hardener, are added to the mixture, e.g. in the form of their salts, whilst component (b) may optionally be added at the same time as or after component (a).

It is also possible for the mixture according to the invention to contain, in addition to reaction product (I) or (Ia), at least one polycarboxylic acid component which is not bonded to a polymer or condensation chain and which contains a group according to formulae (II) to (IX), (XI) and (XIII) to (XV), but in at least partially hydrolysed form or in the form of a salt, and/or trimellitic acid. Other free acids include, for example, those listed for $R^5$, and also tetrahydrofurantetracarboxylic acid, benzofurantetracarboxylic acid and benzofuranhexacarboxylic acid. In addition to carboxyl groups, these additional acids may also be at least partially esterified, hydrolysed to form free carboxyl groups or be converted into salts. Again, the mixtures may harden even under mild conditions, e.g. at room temperature or at even lower temperatures, e.g. 0° C., to form films having excellent properties. These additional acids may also, optionally, be present in the form of their partial esters or partial salts. Ester formation may be effected either on the reaction product (I) or (Ia) or may be carried out on the anhydride or the free COOH groups before the reaction product is obtained.

The proportion of oligomeric anhydride component VI in the form of the free acids or salts is preferably 0.1 to 99.9, more particularly 30 to 70% by weight, based on the total amount of polycarboxylic acids.

If the polycarboxylic acids also contain trimellitic acid, the amount thereof, based on the total amount, is 0.1 to 30, preferably 5 to 20% by weight.

The term "polymeric polymerisation and/or condensation products" for $R^1$ is also intended to cover oligomers. The polyesters which form the group $R^1$ of the reaction product (I) or (Ia) or those polyesters which are freely present in the binder may be prepared in per se known manner from known polycarboxylic acids, such as phthalic acid, isophthalic acid, terephthalic acid, halogenophthalic acids such as tetrachloro- or tetrabromophthalic acid, adipic acid, sebacic acid, fumaric acid, maleic acid, endomethylenetetrahydrophthalic acid, trimellitic acid, optionally together with monocarboxylic acids such as benzoic acid, butylbenzoic acid, lauric acid, isononanoic acid, fatty acids of naturally occurring oils or from mixtures or anhydrides of the abovementioned acids, where they exist. Suitable alcohol components of the polyesters include, for example, polyhydric alcohols, such as ethylene glycol, the propane diols, butane diols, pentane diols, hexane diols, neopentyl glycol, diethylene glycol, cyclohexanedimethanol, trimethylpentanediol, trimethylol ethane or propane, glycerol, pentaerythritol, dipentaerythritol, bishydroxyethyliso- or -terephthalic acid esters, trishydroxyethyl isocyanurate, optionally together with monohydric alcohols such as butanol, octanol, lauryl alcohol, linoleyl alcohol, ethoxylated or propoxylated phenols or the like, either alone or in admixture.

The polyesters in the binder or from the reaction product (see formulae (I) and (Ia)) can also be prepared by at least partial decomposition of high molecular polyesters of an aromatic nature, such as terephthalic acid-ethylene glycol or butane diol polyesters, isophthalic acid-ethylene glycol or hexane diol polyesters, by reacting with mono- and/or polyhydric alcohols, esters, dicarboxylic acids or the like. If the reaction is effected with monohydric alcohols, these may be used in minor amounts.

The condensation resins, also in the form of polyesters, may also include those having at least one of the following groups: esters, amide, imide, ether, thioether, sulphone or amine groups. The hydroxyl groups of the $R^1$ group may also be phenolic, but are preferably alcoholic. Particularly suitable ones include polymerisation products prepared by homo- or copolymerisation of hydroxyalkyl acrylates or methacrylates or maleinates with olefinically unsaturated monomers, e.g. styrene, α-methylstyrene, vinyltoluene, alkyl acrylates, allyl compounds, cyclopentadiene and the derivatives thereof, in known manner.

Other examples of resins include, polymerisation resins in the form of polyvinyl alcohol, copolymers of vinyl alcohol and unsaturated monomers, such as styrene and/or acrylic acid esters, these copolymers being at least partially saponified, and phenolic resins with free hydroxymethyl and/or hydroxyethyl groups.

Examples of phenolic resins with free OH groups include resols. Suitable phenolic components are mono- or polyvalent mono- or polynuclear phenols, such as phenol, the various cresols, xylenols with two hydrogen atoms in the ortho or para position relative to the hydroxyl group, butylphenols, naphthol, resorcinol, diphenylol methane, diphenylol propane, but preferably those with at least two reactive hydrogen atoms, e.g. phenol or resorcinol. Examples of aldehyde components for the phenolic resins include, formaldehyde in aqueous solution, as paraformaldehyde or in the form of other substances which split off formaldehyde, such as trioxan, acetaldehyde, e.g. in the form of substances which split off acetaldehyde, higher aldehydes, such as propionaldehyde, butyraldehyde, isobutyraldehyde and benzaldehyde.

Suitable alkylphenols include those which are di- or trifunctional with respect to formaldehyde, particularly o- or p-alkylphenols with straight or branched chains or cyclic alkyl or aralkyl groups the alkyl group of which contains 1 to 20 carbon atoms, such as p-isopropyl-, p-tert.-butyl-, p-isooctyl-, p-isononyl-, p-isododecyl-, o-sec.-butyl-, o-isononyl-, o-isododecyl-, p-cyclohexyl-, and 3,5-diisopropyl- and 3,5-diisobutylphenol. The alkylphenols may also contain minor amounts of higher alkylated phenols. Preferably, however, the iso compounds of the above mentioned groups and tert.-butylphenols are used.

Suitable resols are those wherein, on condensation, the molar ratio of phenol to formaldehyde is 1:(0.9 to 1.8), preferably 1:(0.95 to 1.4).

Suitable epoxide compounds—both for $R^1$ and for those which are freely present in the binder—include, for example, polyepoxy alkanes with 4 to 20, preferably 4 to 12 carbon atoms and 2 to 6, preferably 2 to 4 oxirane rings; also, epoxidised butadiene oils, the C-alkylation products thereof, e.g. isoprene oils; aliphatic glycidyl ethers, e.g. glycidyl ethers of polyols, such as ethylene glycol, di- and/or triethylene glycol, 2,2-dimethylpropane diol, propane-1,2- or -1,3 diol; butane-1,4- or -1,3-diol, pentane-1,5-diol, hexane-1,6-diol, and glycerol, trimethylol propane, cyclohexyldimethanol, glycidyl ethers containing siloxan groups, epoxidised fatty acid esters, e.g. epoxidised soya oil, epoxidised linseed oil, or dimeric and/or trimeric compounds of this type; alicyclic bis-epoxides, e.g. vinylcyclohexene dioxide, limonene dioxide, bis-(epoxycyclohexyl)-methane or -propane, dicyclopentadiene dioxide, bis-(epoxycyclopentyl-ether); epoxidised aliphatic and/or cycloaliphatic allyl ethers, and/or allyl esters, e.g. bis(-epoxypropyl)hexahydrophthalate, bis(-epoxypropyl)-adipate; and also epoxidised polyesters and/or oligomeric or polymeric esters of glycidyl acrylic or methacrylic acid and/or the copolymers thereof, e.g. with acrylic or methacrylic acid esters, maleic acid esters, ethylene, propylene, butylene, styrene, vinyltoluene, α-methylstyrene, vinylcyclohexane; and trimerised epoxide compounds, e.g. triglycidylisocyanurate, either individually or in admixture.

In addition, mixtures of the epoxide compounds or monoepoxides alone or epoxides in admixture may be used. Examples of monoepoxides include olefin oxides, such as octylene oxide, butylglycidyl ethers, allylglycidyl ethers, phenylgycidyl ethers, p-butylphenolglycidyl ethers, cresylglycidyl ethers, 3-(pentadecyl)-phenolglycidyl ethers, styrene oxide, glycidyl methacrylate, cyclohexenevinyl monoxide, dipentene monoxide, pinene oxide, glycidyl esters of tert. carboxylic acids. In particular, the component (b) which is not bonded as a reaction product may be present in the form of at least one polyepoxide optionally in admixture with at least one monoxide.

Of the abovementioned epoxide compounds, the aliphatic and cycloaliphatic ones, in particular, react very easily, both in free and bonded form, with the carboxylic acid compounds (a) or the COOH and/or salt groups thereof, with cross-linking and the formation of polymers.

Examples of alkali metal or alkaline earth metal compounds include, hydroxides, oxides and carbonates of sodium, potassium, lithium, calcium, magnesium, barium, zinc, aluminium or the like, or the salts of these metals with carboxylic acids or amino acids having tertiary or quaternary N-atoms, e.g. acetates or salts of N,N-diethylaminoacetic acid, 2-(dimethylamino)-propionic acid, tri- or tetra(carboxyalkyl)-amine, either alone or in admixture. Examples of amines for salt formation include, e.g., those of formula

$$R^6-N-R^7 \atop R^8 \qquad (XXV),$$

a morpholine compound or a quaternary ammonium salt of a monocarboxylic acid with 1 to 5, preferably 1 to 3 carbon atoms. In formula (XXV) $R^6$, $R^7$ and $R^8$ may be the same or different and each represents a hydrogen atom, or an aralkyl (e.g. benzyl), $C_1$–$C_8$ alkyl (preferably $C_1$ to $C_5$ alkyl), cycloalkyl (such as cyclohexyl), or a $C_1$–$C_5$ (preferably $C_1$–$C_3$) hydroxyalkyl group. Examples of such amines include trimethyl-, triethyl-, tributylamine, N-dimethylcyclohexylamine, N-dimethylbenzylamine. In some cases it may be necessary to use the salt-forming organic bases in an excess relative to the carboxyl group equivalents. The inorganic cations are generally used in a minor amount.

The ratio of anhydride groups in reaction product (I) or (Ia) to the free OH groups in component (c1) may vary within wide limits, e.g. from 99:1 to 1:99, but is preferably from 20:1 to 1:20.

In many cases, excellent cross-linking is obtained even under mild conditions, e.g. at room temperature, for example at 20° C. or at slightly elevated temperatures, e.g. at 80° C., and/or under stoving conditions, e.g. at 120° C. and above, even without a catalyst. However, an increase in temperature, e.g. to 30° to 210°, preferably 80° to 190° C., makes the hardening time considerably shorter. Therefore, even under shock drying conditions such as those used for coil or can coating processes, i.e. at temperatures of 200° to 350° C. for extremely short periods, e.g. 10 seconds to 3 minutes, excellent coatings are obtained.

The ratio of free carboxyl groups of the polycarboxylic acid units (a) to the epoxide group equivalent in the epoxide compounds (c2) may generally be 100:1 to 1:100, preferably 20:1 to 1:20. Within the preferred range, e.g. with a ratio of 1:1, particularly good film-forming properties are obtained. However, in many cases, it may also be desirable to use an excess of COOH groups, e.g. to improve adhesion. If required, excess epoxide groups may be used, e.g. in strongly lipophilic systems, for primers, for example. The particular ratio used will therefore be chosen to suit the intended use. As a rule, however, the ratio is within the range given above.

According to another embodiment of the invention, there is additionally added to the binder mixture according to the invention at least one thermosetting synthetic resin selected from melamine resins and urea resins, either alone or in admixture, in an amount of up to 30, preferably from 2 to 15% by weight of the total solids content. The addition of such a resin may result in a considerable increase in the resistance to chemicals and solvents, particularly when hardening is effected at an elevated temperature.

Examples of such resins are urea and/or melamine resins having free OH groups which may optionally be partially etherified with monohydric alcohols having 1 to 4 carbon atoms. The molar ratio of melamine to formaldehyde during condensation is usually 1:(2 to 4.5) for the formation of the resins. Penta- and hexamethylol melamine are preferred as the melamine components.

To accelerate the reaction of components (a) to (c2) or the hardening process, it may be appropriate to add a suitable catalyst to the mixture in an amount of up to 5, preferably 0.01 to 0.5% by weight, based on the solids content. Examples of basic catalysts which may be used for this purpose include diazabicyclo-octane; diazabicyclononene or -undecene; imidazole derivatives such as 3-methyl-, phenyl- or cyclohexylimidazole; trialkylamines, such as triethyl-, tributyl- or tricyclohexylamine; N-alkylpiperidines; N,N'-dialkylpiperazines; trialkyl- or triarylphosphines; N,N'-tetraalkylaminoalkyloxamides; alkyl N-dialkylaminoalkyloxamidates; and also the substances mentioned above for component (b), i.e. the amines, hydroxides, carbonates, and salts of organic acids of the alkali metals, such as, for example, lithium hydroxide, potassium carbonate, lithium benzoate, and the addition compounds thereof with crown ethers or similar ligands, as well as alkali metal salts of the polycarboxylic acid compounds of formula (I) and (Ia). Chelates of magnesium, aluminium and titanium such as those described as carboxyl group acceptors in German Offenlegungsschrift No. P 27 23 492.0 may also be used for the catalysis. The abovementioned amines or phosphines may also be present in the form of quaternary hydroxides or halides, such as, for example, N-dimethyl-N-lauryl-N-benzylammonium chloride, tetraethylammonium hydroxide and triphenylbenzylphosphonium bromide.

Salts of the abovementioned organic bases with organic acids such as acetic acid, propionic acid, lauric acid or salicylic acid also catalyse the reactions. Mixtures of catalysts may also be used.

The catalysts used in the preparation of the reaction product (I) or (Ia) or in the hardening process may be the same or different. They may be added at any stage of the reaction of components (a) to (c2). However, they are not absolutely necessary.

The binders according to the invention, particularly the reaction products (I) to (Ia), are generally clear to milky-turbid liquids and have an excellent shelf life. They have a low to high viscosity depending on their particular chemical composition. Their solids content may vary within wide limits. However, they may also be of a paste-like nature. They may contain large amounts of pigments and/or fillers. At the same time, they have exceptionally good wetting properties. They may be diluted with water as required, without the addition of a solvent, without flocculating, and show no anomalies of viscosity. They may, therefore, advantageously be used in the form of an aqueous solution, optionally in admixture with water-soluble or water-insoluble solvents. In general, the hardenable binders according to the invention are suitable for many kinds of uses.

According to another aspect of the invention there is provided a process for the preparation of the binders according to the invention, which is characterised in that (a) halogen-free polycarboxylic acid compound; and
(b) a substance forming a salt with COOH groups selected from alkali metal and alkaline earth metal salts, organic bases and/or ammonia; are reacted simultaneously or in any desired sequence, in at least one step, with (c1) a polymer containing OH groups and/or
(c2) an epoxide compound, to form reaction products of formula (I) or (Ia) (as hereinbefore defined), any anhydride groups present being hydrolysed at any desired stage of the process but not later than the salt formation stage. It is also possible to effect only partial hydrolysis.

The reaction may be carried out in one or more, preferably up to 4 stages. Thus, it is possible, for example, (I) to react the polymer (c1) containing OH groups with the polycarboxylic acid compound (a) in a first step and then hydrolyse the reaction product in a second step, then in a third step to react the epoxide compound (c2) and in a fourth step to react component (b) to effect formation of a salt;

(II) to proceed as in (I) for the first and second steps, and in the third step to effect the salt formation with component (b) and in the fourth step to react the epoxide compound (c2);

(III) in a first step, to hydrolyse the polycarboxylic acid compound (a) in the form of the anhydride, or to start directly with a polycarboxylic acid compound (a) in the form of a free acid and then react this acid or the hydrolysis product with the epoxide compound (c2), after which salt formation is effected by reacting with component (b);

(IV) in a first step, to react the polymer (c1) which contains OH groups with the polycarboxylic acid compound (a), in a second step to hydrolyse the reaction product, and in a third step, or at the same time as the hydrolysis, to effect salt formation with component (b);

(V) in a first step, to react components (c1) and (c2) simultaneously with the polycarboxylic acid compound (a), after which hydrolysis and the salt formation with component (b) are effected either simultaneously or one after the other;

(VI) to react components (a) to (c2) in one step with simultaneous hydrolysis; or (VII) to react the polycarboxylic acid compound (a) with component (b) in a first step, with salt formation, and if component (a) contains anhydride groups to effect hydrolysis at the same time, and react the product thus obtained with the epoxide compound (c2) in a second step.

Depending on the proportions of components (a) to (c2) used, the binder may contain unreacted amounts of components (a) to (c2). However, it is also possible to subsequently add further amounts of these components to the reaction product, whilst the chemical structure of the reacted components and the components added later may be the same or different, depending on the intended use or the properties desired of the binders according to the invention.

As shown by the above embodiments of the process according to the invention, in some cases it is also possible to omit a separate hydrolysis step, just as it is possible to omit the chemical reaction of either component (c1) or component (c2) to form the reaction product of formula (I) or (Ia).

The quantity of water used for hydrolysis may be up to 500%, preferably from 5 to 300%, of the theoretical quantity required.

Owing to their varying chemical compositions, the binders according to the invention are suitable for a wide range of uses, e.g. for the preparation of coating systems which harden at room temperature or at elevated temperatures. They may also be combined with aqueous plastics dispersions, such as dispersions of thermoplastics for example, those based on polyvinyl acetate, polyvinyl chloride, acrylic and/or methacrylic polymers, polyvinyl ethers, -chloroprene, -acrylonitrile and ethylene-butadiene-styrene copolymers. They are particularly compatible with dispersions of copolymers made more polar by grafting with suitable monomers, e.g. hydroxyalkyl acrylates or methacrylates, wherein the hydroxyalkyl group is an hydroxyethyl or -propyl group; acrylic acid, maleic acid or the esters thereof; vinyl esters of saturated or unsaturated aliphatic, cycloaliphatic and/or aromatic carboxylic acids and the like. If required, the dispersions are used together with dispersion adjuvants.

By using the binders according to the invention, which have excellent stability to u.v. radition, it is possible to prepare coating systems, e.g. enamels, which are non-pigmented, pigmented or provided with other fillers and which harden sufficiently rapidly, possibly in the presence of a catalyst, even at room temperature, to yield coatings having outstanding mechanical properties. Coatings with high mechanical strength and a high resistance to chemicals are thereby obtained.

The binders according to the invention may be applied to all kinds of substrates provided that the latter can withstand the hardening temperature of the coating. Suitable substrates include, for example, ceramics, wood, glass, concrete, plastics, and preferably metals, such as, for example, iron, zinc, titanium, copper, aluminium, steel, brass, bronze, magnesium or the like, whilst the substrates may, if required, be made more receptive to adhesive or more corrosion-resistant by suitable mechanical and/or chemical pre-treatment. However, the binders according to the invention adhere extremely well to all kinds of metal substrates without any adhesive priming or intermediate layer. The good adhesion of the coatings corresponds to the values GT 0A to GT 1A according to the test method of DIN 53 151. These coatings also deform very well, are highly resistant to weathering and exceptionally resistant to chemicals.

The binders according to the invention are suitable for the production of anti-corrosive coatings and/or intermediate coatings for many purposes, particularly as resistant lacquers and matt lacquers. They are also suitable for coating and finishing articles which come into contact with propellents and solvents, and for providing protection from atmospheric effects, e.g. road markings, components for electrotechnical uses or parts thereof, particularly electric conductors, and for coating articles subjected to thermal stress.

Owing to their favourable properties, coating compositions comprising the binders according to the invention are also highly suitable for one-coat lacquering. Depending on the choice of components, sheet metals coated with the agents according to the invention may subsequently be deformed by deep drawing, squaring off, profiling, stamping or the like, without any appreciable effect on the favourable properties of the coating. The adhesive coating layer may be left as it is or it may serve as an intermediate layer, i.e. an undercoat, for additional coatings, which may consist of the same or another conventional coating material.

As required, the coatings obtained may be glossy or matt with excellent mechanical and chemical resistance and good weathering properties. On the other hand, it is also possible to produce matt enamels with outstanding mechanical and chemical properties. Surprisingly, large amounts of pigments and fillers are not needed for this purpose.

Another use for the binders according to the invention stems from their suitability as cross-linking resins with an emulsifying action or protective colloids, thickeners or thixotropic agents for aqueous dispersions and synthetic resins. Owing to their good diluting qualities and other favourable properties, the binders according to the invention are also suitable for use in paint application by electrodeposition.

The binders according to the invention may also be used for adhesives which can be diluted with water. They are also suitable as binders for textile, organic and/or inorganic materials. They are also suitable for use in hardenable moulding compositions, casting resins, cements, cellular or porous materials, such as foams, and as insulating lacquers.

In another aspect, the invention provides a water-dilutable adhesive binder comprising (A) a soluble reactive binder according to the invention together with (B) an aqueous plastics dispersion of a polymerisation resin, wherein the polymerisation resin of the plastics dispersion is at least one polymerisation resin (B1) of an elastomer which is optionally modified at least partially with COOH and/or sulphonic acid groups, and/or (B2) of an acrylic copolymer, and wherein the proportion of reactive binder (A) is 5 to 40, preferably 10 to 20% by weight and the proportion of component (B) is 60–95, preferably 80–90% by weight, based on the total solids content. (A) and (B) together make up 100% by weight.

The water-soluble reactive binder used according to the invention has the advantage, over binders hitherto used, of being in water-soluble form of capable of being diluted with water before it is incorporated into the adhesive, so that it does not first have to be emulsified or dispersed in water. These binders also contain reactive chemical groups which may, under certain conditions, react with one another and/or—if there is a suitable choice of elastomer or acrylic resin components—with this component, so that genuine chemical cross-linking can occur both between the individual molecules of the components of the reactive binder and also between these and the elastomer or acrylic resin components.

In this way, the strength of the adhesive bonding at room temperature and at elevated temperature is several times greater than when the chemically unreactive resins dispersed in water, as used hitherto, are used.

Examples of elastomers (B1) for use in this embodiment of the invention include natural or synthetic rubber latex, e.g. based on polybutadiene, acrylonitrile rubber, butadiene-styrene copolymer, chlorosulphonated polyethylene, but preferably poly-2-chlorobutadiene, or a copolymer of poly-2-chlorobutadiene with a carboxylic acid, such as acrylic and/or methacrylic acid.

Examples of acrylic copolymers for use as component (B2) include, copolymers of acrylic compounds, such as acrylic or methacrylic acid, maleic acid or the derivatives thereof, e.g. the esters, amides or nitriles thereof, preferably alkyl and/or hydroxyalkyl acrylates or methacrylates with 1 to 6 carbon atoms in the alkyl or hydroxyalkyl group.

Examples of comonomers for component (B2) include, maleic acid esters, vinyl esters of saturated or unsaturated aliphatic, cycloaliphatic and/or aromatic carboxylic acids, styrene, α-methylstyrene and vinyltoluene.

The presence of reactive groups, e.g. COOH and/or sulphonic acid groups and possibly additional OH groups in at least one of the components (B1) and (B2) may increase the strength of adhesive bondings made with the adhesives according to the invention to a considerable extent. If the components (B1) and/or (B2) contain carboxylic acid groups, e.g. derived from acrylic or methacrylic acid, polymerised into them, when the adhesive is cross-linked at elevated temperature not only these carboxylic acid groups but also those of the reactive polymer mixture may react with the epoxide groups present to form a cross-linked network of α-oxycarboxylic acid esters.

Generally, if the binder according to the invention is used for adhesives, the polycarboxylic acid component (a) is based on trimellitic anhydride and an alkylene glycol with 2 or 3 carbon atoms in the alkylene group.

If the reactive binder (A) used for adhesives according to the invention contains a reaction product of the above formula (I) or (Ia) (defined as above) the group $R^1$ in formula (I) or (Ia) is preferably a group derived from a branched polyester based on at least one dicarboxylic acid, an aliphatic diol and a triol, and the free COOH groups on the $R^2$ group and/or $R^5$ group are partially esterified with a polyhydric alcohol and the other anhydride or COOH groups are present in the form of a quaternary ammonium salt, and the epoxide compound (c2) is in the form of an epoxidised fatty acid ester.

Binders (A) may be prepared, for example, from (c1) polyesters containing OH groups, e.g. those based on phthalic anhydride, neopentylglycol, trimethylolpropane, (a) a bisanhydride, e.g. consisting of 1 mole of ethylene glycol and 2 moles of trimellitic anhydride, (c1) epoxidised oils such as soya oil and/or linseed oil, and (b) ammonia and/or trialkylamine.

The adhesive according to the invention may be applied to the surface which is to be bonded and may be hardened with or without the use of elevated temperatures, e.g. at a temperature of 80° to 150°, preferably 100° to 120° C. In general, hardening at elevated temperatures is preferred. In order to increase the adhesive action still further, it is advantageous to activate the adhesive by heat treatment at 40° to 80°, preferably 55° to 65° C., before applying it to the surface which is to be bonded. The details of the procedure are as follows:

The aqueous colloidal dispersion of a polymer (B), e.g. of poly-2-chlorobutadiene with or without carboxylic acid groups such as acrylic or methacrylic acid polymerised into it, or a mixture of unmodified poly-2-chlorobutadiene and poly-2-chlorobutadiene containing carboxylic acid groups polymerised into it, or a copolymer (B2) of various acrylic esters, optionally together with other comonomers, or a mixture of a copolymer of this kind with corresponding copolymers modified with carboxylic acid, is mixed with the aqueous hydrosol of the reactive binder, e.g. with vigorous stirring, until the mixture is homogeneous, whilst the adjuvants or fillers given hereinafter may be added if required.

The adhesive may then be brought into contact with the surface which is to be bonded, and may then be hardened at a temperature of 60° to 110°, preferably 70° to 90° C.

These adhesive mixtures may be used immediately for adhesive bonding, provided that the requirements for adhesive strength are not very stringent. However, if maximum strength is required, i.e. so that, when tested, cracks appear in the bonded material and not in the bonding layer it is generally necessary either to store the finished adhesive at room temperature for a few weeks or to heat it in sealed containers to 40° to 80°, preferably 55° to 65° C., for a few days. During this period, cross-linking occurs between the COOH and epoxide groups and thus there is an increase in strength within the binder or between the binder and the elastomer or acrylic component, but this process must not be allowed to continue to completion otherwise the tackiness of the compound will no longer be sufficient to enable it to be used as an adhesive. Adhesives subjected to optimum preliminary reaction may be used immediately or else may be stored at room temperature in sealed containers for several months before use without losing any of their effectiveness. Adhesive bonding is carried out in the manner normally used for contact adhesives, i.e. the parts which are to be bonded are roughened, then thoroughly cleaned, e.g. by brushing or blowing away any dust, and the parts which are to be joined together are coated with adhesive.

However, in contrast to aqueous contact adhesives used up till now, one does not have to wait for the water used as the dispersing agent to evaporate after the application of the adhesive; instead, this evaporation is speeded up by applying heat and at the same time the surface to which the adhesive has been applied is heated to temperatures of about 100° C. Meanwhile, at first, the tackiness increases as the water evaporates, until further reaction between the carboxyl and epoxide groups still present causes the tackiness to decrease as a result of progressive cross-linking. The range of maximum tackiness and maximum adhesive strength depends on a variety of factors, e.g. the amount of adhesive, the heat applied, the nature of the surfaces being bonded, and so on. This time range is easily determined.

After a predetermined heating period as described above, the parts which have been coated with adhesive and heated are contacted one against the other, still hot, and are immediately pressed together for a short time, e.g. 20 to 30 seconds at 0.3 to 0.5 mPa. The bonded articles, e.g. layered articles, are then taken out of the press and left to cool. The layer of adhesive can immediately be put under stress or processed as the adhesive has already attained its final maximum strength.

In this way, the adhesive mixtures on which the invention is based may be used to bond together a wide range of materials in a short time to form a very strong bond. These materials include, for example, rubber, plastics, leather, wood, chipboard, plywood boards, textiles, felt, fabric, woven goods, fleece, carpets, cork, cardboard, metal or the like, either alone or in combination.

In order to impart specific properties to the adhesive mixtures, small amounts of conventional additives such as anti-foaming agents, wetting agents, thickeners, anti-ageing agents, fillers or the like may be added to these mixtures, so as to yield finished contact adhesives which are suitable for a variety of applications.

In the following examples, T represents parts by weight and % represents percent by weight, unless otherwise specified. These relate to the content of non-volatile solids, unless otherwise stated. In each case, the composition of the anhydrides or of the acids obtained from the anhydrides by hydrolysis was determined by gel permeation chromatography.

Unless otherwise specified, as the polycarboxylic acid component (a), anhydride mixtures were prepared by reacting trimellitic anhydride with propane-1,2-diol, consisting of trimellitic anhydride and anhydrides (XIV) and (XV), and as the component (c) containing OH groups, polyesters were used, prepared on the basis of phthalic anhydride, isophthalic acid, maleic anhydride, propanol and glycerol.

The following were used as the epoxide compounds (c2):
A = epoxidised linseed oil
B = epoxidised soya oil
C = epoxidised butadiene oil
D = pentanediol-1,5-diglycidyl ether
E = 3,4-epoxycyclohexylmethyl-3',4'-epoxycyclohexane carboxylate
F = diphenylolpropane-bis-glycidyl ether
G = bisglycidyl tetrahydrophthalate
H = dicyclopentadiene dioxide
I = hexafluorodiphenylolpropanebisglycidyl ether
J = epoxy ester phenol-formaldehyde-novolac
K = 1,3-bis-[3(2,3-epoxypropoxy)-propyl]-tetramethyldisiloxan In the Examples relating to use for adhesives, the adhesive layer was cooled to room temperature and the peel strength of the adhesive bonding was tested at a peel rate of 200 mm/min at a peeling angle of 180° C. (initial peel strength). The results are given in Table 1.

EXAMPLE 1

(Preparation of the reaction product (I) or (Ia))

(4-step one-pot method)

100 T of anhydride mixture (acid number/$H_2O$ = 560) and 30 T of acetone are homogenised at 50° C. A solution of 127 T of a polyester (OH number = 107) in 70 T of methyl ethyl ketone is added dropwise thereto over one hour. At 90° C. the mixture is stirred until the reaction mixture has attained an acid number in water of 197 (based on 100% resin). Then another 15 T of water are added. After stirring for 6 hours at 80°–90° C. the acid number in butanol is 180 (100% resin). The temperature of the mixture is reduced to 60° C. and 133 T of an epoxidised linseed oil (epoxide number = 8.9) are added dropwise over 2 hours. The mixture is stirred until the acid number in butanol has fallen to 90. Then a mixture of 56 T of dimethylaminoethanol in 540 T of water is stirred in. A light yellow opalescent solution is obtained. Finally, the organic solvent is distilled off at 40° C. at a pressure of 0.1 bar. After filtering, a yellowish, almost clear aqueous resin solution is obtained. This shows distinct diffraction rings under an ultra-microscope. The solids content (1 hour at 125° C.) is about 39%.

If required, at least some the organic solvent can be left in the end product.

EXAMPLES 2 to 24

The reaction products according to Examples 2 to 24 (see Table 1) are prepared analogously to Example 1.

EXAMPLE 25

(2-step method)

131.4 T of epoxy compound (A) (epoxy number = 8.9) are homogenised for 30 minutes at 40° C. with 183.6 T of a 66.7% solution of a polyester with free OH groups (OH number = 107). Then 100 T of powdered anhydride mixture (Acid No. $H_2O$ = 550) are added portionwise over 1 hour. The mixture is stirred at 50°–70° C. until a sample is clearly soluble in 25% water/ammonia water (3:1). This occurs after about 5 hours. The solvent is distilled from the reaction mixture in vacuo (0.1 bar) and a mixture of 57 T of 25% ammonia water and 450 T of water is stirred in. A light yellow, slightly opalescent resin solution is obtained. The solids content is about 41%.

EXAMPLE 26

(3-step method)

185 T of epoxide compound B (epoxy number=6.4), 188 T of polyacrylate with free OH groups (OH number=70) and 30 T of water are stirred together at 30° C. After 0.1 T of triethylamine and 0.5 T of acetic acid have been added, 90 T of anhydride mixture (Acid No./H$_2$O=498) are added over 3 hours. After four hours the temperature is increased to 55° C. and the mixture is stirred at this temperature until a sample of the reaction mixture dissolves in ammonia water (see Example 25) to give a slight opalescence. After a mixture of 60 T of dimethylaminoethanol and 600 T of water has been stirred in, a milky resin solution is obtained with a solids content of 42.8%.

Table 1 below gives a summary of the preparation and composition of the binders according to the invention in the form of the reaction products (I) and (Ia).

The abbreviations used in Table 1 for the solvents, etc., have the following meanings:

MEK—methyl ethyl ketone
    Ac—acetone
    Tol—toluene
    Xyl—xylene
    CHX—cyclohexane
    MIK—methyl isopropyl ketone
    PMSA—pyromellitic anhydride
    DABO—diazabicyclooctane
    NPI—N-phenylimidazole
    DMA—dimethylamine
    TMA—trimethylamine
    DMAE—dimethylaminoethanol
    TDMAP—tris-dimethylaminophenol
    CHEA—N-cyclohexyl-N-ethylamine
    BPTDA—benzophenonetetracarboxylic dianhydride
    DMP—N,N'-dimethylpiperazine
    TMAE—N,N'-tetramethylaminoethane
    DMAP—dimethylaminopropan-1-ol In Table 1 "Initial acid no." means the acid number of the reaction product from the reaction of the OH polymer (c1) and the polycarboxylic acid unit (a) before hydrolysis. "Final acid no. 1" means the acid number of this product after hydrolysis. "Final acid no. 2" means the acid number after the reaction with the epoxide compound (c2).

(II) Technical lacquer tests

The aqueous binder solution prepared according to Examples 1 to 26 is homogenised with titanium dioxide pigment (1:1, based on solid resin) in a bead mill or ball mill, then adjusted to spraying viscosity (20 DIN-sec/4 mm beaker) with water and applied to phosphatised sheet iron with a spray gun in known manner.

EXAMPLE 27

(Combination with dispersions for stoving purposes)

200 T of the aqueous resin solution from Example 2 (34.4% solids, see Table 1) are homogenised with 163 T of titanium dioxide pigment in a bead mill. Then 272 T of an acrylate dispersion (50% in water) containing about 5 mol-% of hydroxyethyl acrylate polymerised into it to improve the compatibility, and 14 T of hexamethoxymethylmelamine are added. The mixture is adjusted as in samples 1 to 26.

TABLE 1

| Example | 2 | 3 | 4 | 5 | 6 | 7 |
|---|---|---|---|---|---|---|
| Anhydride mixture (a) | | | | | PMSA | |
| acid number in H$_2$O | 560 | 498 | 486 | 486 | 1028 | 500 |
| T | 100 | 100 | 100 | 100 | 100 | 50 |
| Solvent | MEK | Ac/Tol (1:1) | Xyl | Pentanol-3 | Ac/CHX (3:1) | — |
| T | 75 | 104 | 108 | 107 | 172 | — |
| OH-Polymer(C$_1$) | Polyester | Polyester | Polyester | Polyester | Polyester | Polyacrylate |
| OH-number | 112 | 88 | 88 | 88 | 86 | 100 |
| T | 121 | 141 | 141 | 142 | 300 | 208 |
| H$_2$O/T | 15 | 12 | 12 | 12 | 16 | 7.5 |
| Catalyst | Piperazine | DABO | Li-benzoate | NPI | Triethylamine | K$_2$CO$_3$ |
| T | 0.5 | 0.2 | 0.3 | 0.25 | 1.0 | 0.7 |
| Initial acid no. H$_2$O | 195 | 168 | 165 | 168 | 248 | 124 |
| Final Acid no.1 1 n-Butanol | 180 | 168 | 168 | 166 | 221 | 109 |
| Epoxide compound (C$_2$) | A | A | A | A | A | A |
| Epoxy no. | 8.80 | 8.7 | 8.7 | 8.7 | 9.0 | 8.7 |
| T | 131 | 132 | 132 | 131 | 290 | 62 |
| Final acid no. 2 n-Butanol | 93 | 88 | 86.5 | 86.6 | 221 | 64 |
| Salt forming substance (b) | ammonia | Methylamine | DMA | TMA | DMAE | Triethylamine |
| T | 40 (25%) | 45 (40%) | 42 (60%) | 67.9 (45%) | 72 | 38 |
| H$_2$O T | 530 | 860 | 860 | 858 | 1033 | 400 |
| Solids content | 34.3 | 30.8 | 32.2 | 30.5 | 41.8 | 41.0 |
| Example | 8 | 9 | 10 | 11 | 12 | 13 |
| Anhydride mixture (a) | | | | | | |
| Acid no. in H$_2$O | 556 | 498 | 486 | 473 | 557 | 498 |
| T | 100 | 100 | 101 | 106 | 100 | 100 |
| Solvent | EA/MEK (1:3) | MIK | Xyl/MEK | Ac | Tol/Ac (1:1) | MEK |
| T | 115 | 105 | 200 | 105 | 110 | 130 |
| OH-Polymer(C$_1$) | Polyester | Polyester | Polyester | Polyester | Polyester | Polyester |
| OH-no. | 88 | 85.6 | 30 | 72.8 | 73 | 62.5 |
| T | 176 | 145 | 413 | 145.4 | 158 | 199 |
| H$_2$O/T | 15 | 12 | 117 | 15 | 10 | 15 |
| Catalyst | N,N-Dimethyl-aniline | Tributylamine | Trimethylamine/acetic acid | TDMAP | crown ether | N,N-TMAE |

TABLE 1-continued

| | | | | | | |
|---|---|---|---|---|---|---|
| T | 1.0 | 1.5 | 1.7 | 0.7 | 0.08 (based on K) | 0.3 |
| Initial acid no. | 164 | 161 | 98.4 | 159.4 | 165 | 138 |
| $H_2O$ | | | | | | |
| Final acid no. 1 | 142 | 161 | 100.7 | 161.0 | 158 | 137 |
| n-Butanol | | | | | | |
| Epoxide compound ($C_2$) | B | D | A | C | E | F |
| Epoxy No. | 6.1 | 10.7 | 8.65 | 6.0 | 11.4 | 9.56 |
| T | 177 | 105 | 167 | 187 | 102 | 123 |
| Final acid no. 2 | 90.6 | 89 | 61 | 79.7 | 74.5 | 69 |
| n-Butanol | | | | | | |
| Salt forming compound (b) | DMAE | NCHEA | DMAE | DMAE | DMAE | Ammonia (25%)/ |
| T | 36.2 | 80 | 63 | 38 | 47 | $DMAE_{17}$ (1:1) |
| $H_2OT$ | 680 | 513 | 1400 | 642 | 665 | 724 |
| Solids content % | 40.1 | 42.7 | 33.8 | 43.9 | 42.0 | 40.9 |

| Example | 14 | 15 | 16 | 17 | 18 | 19 |
|---|---|---|---|---|---|---|
| Anhydride mixture (a) | | BPTDA | Tetrahydrofuran-tetracarboxylic-dianhydride | | | |
| Acid no. on $H_2O$ | 498 | 742 | 1143 | 550 | 491 | 553 |
| T | 100 | 100 | 100 | 100 | 350 | 100 |
| Solvent | Ac/Xyl (2:1) | CHX/Tol (4:1) | MEK | — | MEK | Ac |
| T | 90 | 140 | 150 | — | 400 | 30 |
| OH-Polymer($C_1$) | Polyester | Polyester | Polyester | Polyacrylate | silicon polyester | Polyacrylate |
| OH-no. | 53.7 | 85.6 | 85.6 | 125 | 77 | 125 |
| T | 108.3 | 203 | 262.3 | 109 | 567.4 | 109 |
| $H_2O/T$ | 11.5 | 12 | 15 | 16 | 36 | 11 |
| Catalyst | Tributylamine | N,N'-DMP | Tripropylamine | DABO | Li-Acetate | triethylamine |
| T | 1.0 | 1.5 | 0.75 | 1.2 | 1.7 | 0.3 |
| Initial acid no. | 210 | 170.7 | | | | |
| $H_2O$ | | | 202 | 208 | 146.6 | 199 |
| Final acid no. 1 | 199 | 172.9 | 195 | 199 | 152 | 188.5 |
| n-Butanol | | | | | | |
| Epoxide compound ($C_2$) | G | A | A | B | H | I |
| Epoxy compound | 11.3 | 8.70 | 8.70 | 6.13 | 19.0 | 7.3 |
| T | 105 | 175 | 228 | 177 | 212.1 | 155.0 |
| Final acid no. 2 | 90 | 91.8 | 98 | 83 | 83.4 | 83.0 |
| n-Butanol | | | | | | |
| Salt forming compound (b) | DMAE | DMAE | DMAE | DMAE | DMAE | DMAE |
| T | 40 | 70 | 89 | 50 | 136.0 | 50.0 |
| $H_2O$ T | 650 | 720 | 1362 | 575 | 2.73 | 576 |
| Solids content % | 41.8 | 41.1 | 30.7 | 41.9 | 39.9 | 41.7 |

| Example | 20 | 21 | 22 | 23 | 24 |
|---|---|---|---|---|---|
| Anhydride mixture (a) | | | | | |
| Acid no. in $H_2O$ | | 498 | 498 | 520 | 498 |
| T | | 100 | | 200 | 300 |
| Solvent | Pentan-2-one | EA-Ac (1:2) | — | Ac | MEK |
| T | | 128 | — | 350 | 400 |
| OH-Polymer($C_1$) | OH-Polyester | OH-Polyester | Polyacrylate | — | OH-Polyester |
| OH-no. | 125 | 62.5 | 53 | — | 108.5 |
| T | 218 | 199.2 | 233 | — | 1381.0 |
| $H_2O/T$ | 36 | 9.0 | 7 | 20 | 30 |
| Catalyst | | Trimethylamine (40% in $H_2O$) | — | Tributylamine formic acid (1:1) | Li-Benzoate |
| T | — | 0.7 | — | 1.5 | 2.0 |
| Initial acid no. | 183.4 | 149.8 | 116.5 | — | — |
| $H_2O$ | | | | | |
| Final acid no. 1 | 185.0 | 143 | 120 | 505 | 76 |
| n-Butanol | | | | | |
| Epoxy compound($C_2$) | J | K | A/B (1:1) | B | — |
| epoxy no. | 12.3 | 8.8 | 7.4 | 6.3 | |
| T | 190.0 | 139.0 | 150 | 450 | — |
| Final acid no. | 93 | 79.6 | 63 | 107 | 76 |
| n-Butanol | | | | | |
| Salt forming compound (b) | DMAE | DMAE | DMAP | Triethylamine | DMAE |
| T | 70.5 | 39 | 50 | 125 | 215 |
| $H_2O$ T | 1020 | 658 | 960 | 1750 | 4035 |
| Solids content % | 41.6 | 42.4 | 36.3 | 30.7 | 32.3 |

EXAMPLE 28

(Combination with dispersions for air-drying)

200 T of the aqueous resin solution from Example 2 (34.3% solids, see Table 1) are homogenised with 150 T of titanium dioxide pigment in a bead mill. Then 280 T of a polyvinyl chloride-vinyl acetate-ethylene dispersion (50% in water) with a glass transition temperature of 20° C. are mixed in. The binder combination is adjusted to pH 7.5 with ammonia (10% in water). The binder mixture may be applied in this form by painting or rolling on, e.g. on to wood, or, as in Example 28, phosphatised sheet iron, as a paint lacquer. High gloss lacquers are obtained which are resistant to yellowing.

EXAMPLE 29

(Combination with melamine resins)

300 T of the aqueous binder system according to Example 10 (33.8% solids, see Table 1) are homogenised with 10 T of hexamethoxymethylmelamine and 105 T of titanium dioxide pigment in a ball mill. After being diluted to spraying viscosity with water (30 DIN-sec/4 mm beaker), the binder is applied to phosphatised sheet metal, then hardened and tested.

EXAMPLE 30

(Combination with melamine resin)

300 T of the aqueous binder from Example 7 (41% solids, see Table 1) are homogenised with 5 T of hexamethoxymethylmelamine and 100 T of titanium dioxide pigment in a bead mill and the mass is further processed as in Example 29.

EXAMPLE 31

(Electrophoresis lacquer)

The aqueous binder described in Example 10 is pigmented with iron oxide red in known manner (100:50, solid on solid). The pigmented binder is then diluted with water/ethylene glycol monoethyl ether (10:1) to a solids content of 15%. An electrophoresis bath containing the diluted pigmented binder is adjusted to 25° C. and phosphatised sheet iron is suspended therein. The binder is deposited at the anode at a voltage of 150 V. After drying and stoving, coatings with high resistance to saline spray and chemicals are obtained to which other coatings adhere exceptionally well.

The films from Examples 1 to 31 are hardened and tested under the conditions given in Table 2. The test results are also given in Table 2.

TABLE 2

| Example | | 1 | 2 | 3 | 4 | 5 | 6 | 7 | 8 | 9 | 10 | 11 |
|---|---|---|---|---|---|---|---|---|---|---|---|---|
| Pendulum | 14 days room temp. | — | 63 | 70 | 85 | 92 | — | — | — | — | — | — |
| hardness | 30 min. 140° C. | 214 | 180 | 185 | 192 | 204 | 212 | 170 | 147 | 137 | 191 | 92 |
| according to | 90 s 280° C. | — | — | — | — | — | 222 | — | — | — | 193 | — |
| Konig (s) | | | | | | | | | | | | |
| Gloss acc. | 14 days room temp. | — | 91 | 86 | 84 | 85 | — | — | — | — | — | — |
| to Lange | 30 min. 140° C. | 88 | 93 | 87 | 86 | 87 | 40 | 90 | 87 | 91 | 91 | 20 |
| 60° | 90 s 280° C. | — | — | — | — | — | 30 | — | — | — | 91 | — |
| resistance to | 14 days room temp. | — | 3 | 1 | 1 | 1 | — | — | — | — | — | — |
| xylene (min) | 30 min. 140° C. | >120 | 120 | 5 | 25 | 45 | 90 | 7 | 5 | 5 | 10 | 15 |
| | 90 s 280° C. | — | — | — | — | — | >120 | — | — | — | 8 | — |
| resistance to | 14 days room temp. | — | 15 | 12 | 17 | 22 | — | — | — | — | — | — |
| water | 30 min. 140° C. | >1200 | 180 | 70 | 120 | >1200 | >120 | >1200 | >120 | 5 | 500 | 120 |
| (min.) | 90 s 280° C. | — | — | — | — | — | >120 | — | — | — | 600 | — |
| Lattice cut | 14 days room temp. | — | 0 | 0 | 0 | 0 | — | — | — | — | — | — |
| | 30 min. 140° C. | 0 | 0 | 0 | 0 | 0 | 0 | 2 | 0 | 1 | 1 | 0 |
| | 90 s 280° C. | — | — | — | — | — | 0-1 | — | — | — | 2 | — |
| Impact strength | 14 days room temp. | — | 40 | 20 | 30 | 40 | — | — | — | — | — | — |
| | 30 min. 140° C. | 4 | 80 | 48 | 68 | 120 | 60 | 4 | 120 | 60 | 4 | 40 |
| | 90 s 280° C. | — | — | — | — | — | 48 | — | — | — | 4 | — |
| Erichsen | 14 days room temp. | — | 7.5 | 5.8 | 6.5 | 7.2 | 9.6 | — | — | — | — | — |
| cupping | 30 min. 140° C. | 8.1 | 8.6 | 8.2 | 8.7 | 9.1 | 8.5 | 2.9 | 10.0 | 6.8 | 4.5 | 9.0 |
| | 90 s 280° C. | — | — | — | — | — | — | — | — | — | 4.1 | — |

| Example No. | | 12 | 13 | 14 | 15 | 16 | 17 | 18 | 19 | 20 | 21 | 22 |
|---|---|---|---|---|---|---|---|---|---|---|---|---|
| Pendulum | 14 days room temp. | — | — | — | — | — | — | — | — | — | — | — |
| hardness | 30 min. 140° C. | 205 | 141 | 198 | 172 | 134 | 89 | 210 | 140 | 225 | 180 | 140 |
| according to | 90 S 280° C. | — | 146 | — | — | — | — | — | 170 | — | 190 | 145 |
| Gloss acc. to | 14 days room temp. | — | — | — | — | — | — | — | — | — | — | — |
| Lange | 30 min. 140° C. | 90 | 89 | 92 | 83 | 83 | 81 | 83 | 92 | 80 | 85 | 88 |
| 60° | 90 S 280° C. | — | 87 | — | — | — | — | — | 88 | — | 87 | 89 |
| Resistance to | 14 days room temp. | — | — | — | — | — | — | — | — | — | — | — |
| xylene | 30 min. 140° C. | >120 | 3 | 180 | 150 | 1 | 1 | >120 | 5 | >120 | 20 | 7 |
| (min) | 90 S 280° C. | — | 2 | — | — | — | — | — | 3 | — | 25 | 6 |
| Resistance to | 14 days room temp. | — | — | — | — | — | — | — | — | — | — | — |
| water | 30 min. 140° C. | >1200 | 300 | 600 | >120 | 16 | 40 | >120 | >1200 | >1200 | >1200 | 600 |
| (min.) | 90 S 280° C. | — | 250 | — | — | — | — | — | >1200 | — | >1200 | 480 |
| Lattice cut | 14 days room temp. | — | — | — | — | — | — | — | — | — | — | — |
| | 30 min. 140° C. | 1 | 0 | 0-1 | 0 | 0 | 0 | 2 | 0 | 2 | 0 | 0 |
| | 90 S 280° C. | — | 0 | — | — | — | — | — | 0 | — | 0 | 0 |
| Impact strength | 14 days room temp. | — | — | — | — | — | — | — | — | — | — | — |
| | 30 min. 140° C. | 4 | 160 | 4 | 20 | 10 | 160 | 4 | 80 | 4 | 80 | 84 |
| | 90 S 280° C. | — | 140 | — | — | — | — | — | 76 | — | 60 | 72 |
| Erichsen | 14 days room temp. | — | — | — | — | — | — | — | — | — | — | — |
| | 30 min. 140° C. | 5.6 | 9.2 | 6.1 | 7.0 | 6.5 | 9.8 | 4.9 | 9.2 | 4.8 | 7.5 | 7.5 |
| cupping | 90 S 280° C. | — | 8.4 | — | — | — | — | — | 8.3 | — | 8.2 | 7.8 |

| Example No. | | 23 | 24 | 25 | 26 | 27 | 28 | 29 | 30 | 31 |
|---|---|---|---|---|---|---|---|---|---|---|
| Pendulum | 14 days room temp. | — | — | 81 | — | — | 110 | — | — | — |
| Hardness | 30 min. 140° C. | 60 | 210 | 200 | 114 | 180 | — | 220 | 190 | 185 |
| acc. to | 90 S 280° C. | 66 | 210 | — | — | — | — | 230 | — | — |
| Konig (s) | | | | | | | | | | |
| Gloss acc. to | 14 days room temp. | — | — | 87 | — | — | 88 | — | — | — |
| Lange | 30 min. 140° C. | 92 | 88 | 91 | 92 | 86 | — | 93 | 92 | — |
| 60° | 90S 280° C. | 90 | 86 | — | — | — | — | 94 | — | — |
| Resistance to | 14 days room temp. | — | — | <1 | — | — | >120 | — | — | — |
| xylene | 30 min. 140° C. | <1 | >120 | 8 | 2 | >120 | — | >120 | >120 | 8 |
| (min.) | 90 S 280° C. | 1 | >120 | — | — | — | — | >120 | — | — |

| | TABLE 2-continued | | | | | | | | | |
|---|---|---|---|---|---|---|---|---|---|---|
| Resistance to water (min.) | 14 days room temp. | — | — | 17 | — | — | 200 | — | — | — |
| | 30 min. 140° C. | 60 | 100 | >120 | >120 | 500 | — | >1200 | >1200 | 400 |
| | 90 S 280° C. | 60 | 120 | — | — | — | — | >1200 | — | — |
| Lattice cut | 14 days room temp. | — | — | 0 | — | — | — | — | — | — |
| | 30 min. 140° C. | 0 | 2 | 0 | 0 | 1 | 0 | 0 | 0-1 | 1 |
| | 90S 280° C. | 0 | 2-3 | — | — | — | — | 0 | — | — |
| Impact strength | 14 days room temp. | — | — | 4 | — | — | 0 | — | — | — |
| | 30 min. 140° C. | 160 | 4 | 4 | 80 | 0 | — | 20 | 8 | 4 |
| | 90S 280° C. | 160 | 4 | — | — | — | — | 28 | — | — |
| Erichsen cupping | 14 days room temp. | — | — | 6.8 | — | — | 6.8 | — | — | — |
| | 30 min. 140° C. | 10.5 | 6.8 | 8.2 | 8.7 | 6.2 | — | 7.5 | 7.0 | 5.5 |
| | 90 S 280° C. | 10.4 | 5.4 | — | — | — | — | 7.3 | — | — |

(III) Discussion of the results

As can be seen from Table 2, the coatings obtained from the mixtures according to the invention are characterised by outstanding pendulum hardness, gloss, high resistance to solvents and water, very good properties of elasticity, as demonstrated in the Erichsen and impact tests. The results of the lattice cut tests also show the excellent adhesion of the films to metal substrates.

(IV) Use of the binders in adhesives (IVa) Preparation of the reactive binder A

EXAMPLE A1

The process starts with a polyester obtained from phthalic anhydride, neopentylglycol and trimethylol propane (molar ratio 1:1:0.05) with an OH number of 70 which is reacted with a bisanhydride obtained from ethylene glycol and 2 moles of trimellitic anhydride according to the process described hithertofore. Hydrolysis is then carried out and the hydrolysis product thus obtained (in the form of a polymeric carboxylic acid) is partially reacted with epoxidised soya oil so that 70% of the COOH groups are still present in free form. These are then neutralised with ammonia to give a product with a pH of about 7.5.

EXAMPLE A2

The procedure of Example A1 is used, except that trimethylamine is used instead of ammonia to neutralise the COOH groups, to form a product with a pH of about 7.4.

EXAMPLE A3

The procedure of Example A1 is used, except that, instead of the epoxidised soya oil, a mixture of epoxidised linseed oil and epoxidised soya oil in a weight ratio of 1:2 is used. For neutralisation, a mixture of 70% by weight of ammonia and 30% by weight of trimethylamine is used. A product with a pH of 7.0 is obtained.

(IVb) Preparation of the adhesives

EXAMPLE 32

A quantity of an aqueous dispersion of a 2-chlorobutadiene polymer containing 700 T of solids is mixed with a quantity of a hydrosol of the water soluble reactive binder (A1) containing 300 T of solids, with the addition of 0.2% of a foam remover in the form of a $C_8$-higher alcohol, with vigorous stirring. The adhesive thus obtained is then applied in a thin layer to test pieces consisting of sole rubber which are 2 cm wide and have been roughened and brushed just beforehand. These test pieces are immediately placed side by side at a spacing of about 14 cm under a red 250 watt lamp, with the coated surface facing the lamp, and are exposed to the lamp for 10 minutes. The test pieces reach a temperature of 100° to 110° C. The test pieces are then placed with their hot adhesive coatings together and pressed in a press for 20 seconds under a pressure of 0.3 mPa.

EXAMPLE 33

Example 32 is repeated, except that half the aqueous colloidal elastomer dispersion consists of an aqueous dispersion of a 2-chlorobutadiene polymer and the other half consists of an aqueous dispersion of a 2-chlorobutadiene/methacrylic acid copolymer.

EXAMPLE 34

Example 33 is repeated, except that the adhesive mixture is heated to 60° C. for 4 days before use.

EXAMPLE 35

Example 34 is repeated, except that the ratio of 2-chlorobutadiene homopolymer to copolymer in the dispersion is 75:25.

EXAMPLE 36 and 37

Examples 34 and 35 respectively are repeated, except that the solids content of the reactive binder is 10% of the total solids content.

EXAMPLE 38

Example 37 is repeated, except that the ratio of 2-chlorobutadiene homopolymer to copolymer in the dispersion is 25:75.

EXAMPLE 39

Example 32 is repeated, except that the aqueous dispersion consists of an acrylate copolymer obtained from 70% ethylhexyl acrylate, 20% butyl acrylate and 10% acrylonitrile.

EXAMPLE 40

Example 39 is repeated, except that the solids content of the reactive binder is 10% of the total solids content.

EXAMPLE 41

Example 40 is repeated, except that the aqueous acrylate dispersion used consists of a copolymer of 61% ethyl acrylate, 22% octyl acrylate, 10% acrylonitrile and 7% acrylic acid.

EXAMPLE 42

Example 41 is repeated, except that the adhesive mixture is heated to 60° C. for 2 days before use.

All of Examples 31-42 may also be carried out with binders A2 and A3, yielding adhesives with equally favourable properties.

(V) Adhesive tests

The adhesive bonds prepared according to Examples 32 to 42 were tested for thermal stability after being stored at room temperature for 7 days. They were also pre-tempered in a hot cupboard at 70° C. and, after reaching this temperature, one section was attached to a clamp mounted on the roof of the cupboard whilst the other section of the bonded article was loaded with a 300 g weight pre-tempered to 70° C. so that there was vertical tension on the adhesive joint at an angle of 180°.

Table 3 gives the thermal stability for the individual examples of bonded joints in comparison with the strength values of adhesive joints made with aqueous contact adhesives prepared from conventional resins.

TABLE 3

| Example | Initial peel strength N.cm−1 | Thermal stability after 7 days/room temperature (min/cm) |
|---|---|---|
| 32 | 40-50 | 20 |
| 33 | 40-50 | 40 |
| 34 | 50-60 | 140 |
| 35 | 50-60 | 280 |
| 36 | 70-80 | 420 |
| 37 | 90-100 | 840 |
| 38 | 70-80 | 600 |
| 39 | 40-50 | 30 |
| 40 | 50-60 | 120 |
| 41 | 60-70 | 260 |
| 42 | 70-80 | 480 |
| aqueous contact adhesive made from |  | 5-40 |

TABLE 3-continued

| Example | Initial peel strength N.cm−1 | Thermal stability after 7 days/room temperature (min/cm) |
|---|---|---|
| conventional resins | | |

Table 4 shows the maximum initial peel strengths of rubber/rubber bonds which can be obtained with contact adhesives from poly-2-chlorobutadiene or polyacrylate dispersions and the resins used hitherto.

TABLE 4

|  | Initial peel strength (N.cm$^{-1}$) |
|---|---|
| alkylphenol resins | 20-30 |
| terpenephenol resins | 30-40 |
| polyterpene resins | 20-30 |
| colophony resins | 30-40 |
| cumarone/indene resins | 30-40 |
| hydrocarbon resins | 20-30 |

(VI) Discussion of the results

As shown in Tables 3 and 4, the adhesives which use the reactive binders according to the invention are far superior in their thermal stability and initial peel strength to adhesives using conventional resins but containing the same dispersions of elastomer or polyacrylate.

Formula sheet

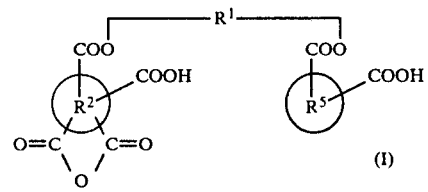
(I)

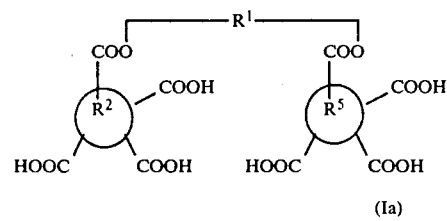
(Ia)

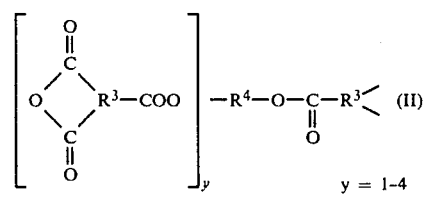
(II)   y = 1-4

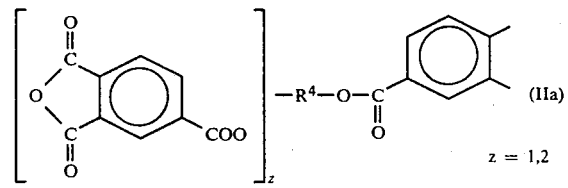
(IIa)   z = 1,2

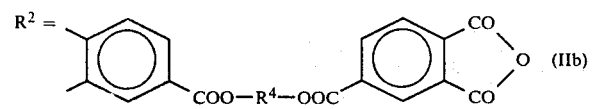
(IIb)

-continued
Formula sheet
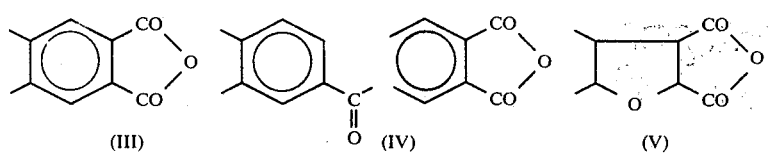
(III)  (IV)  (V)
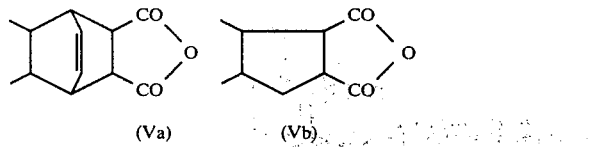
(Va)  (Vb)
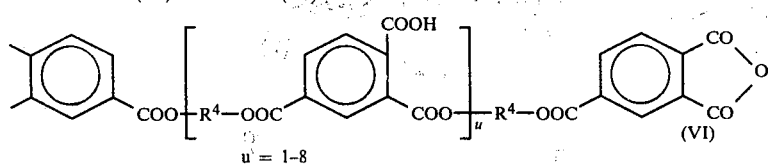
(VI) u = 1-8
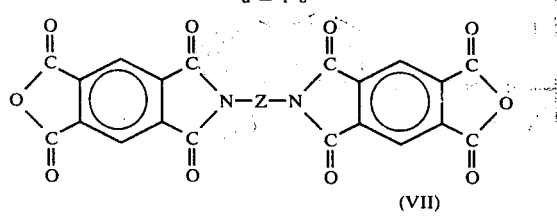
(VII)
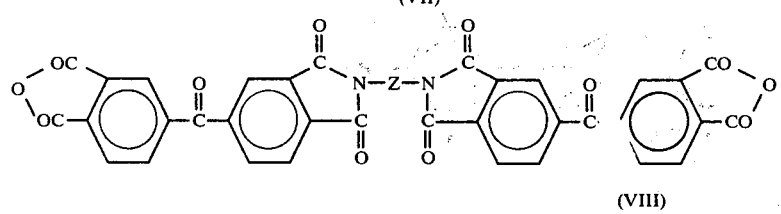
(VIII)
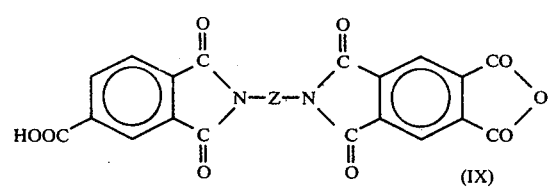
(IX)
$Z = -(CH_2)_m-$  m = 2-8,
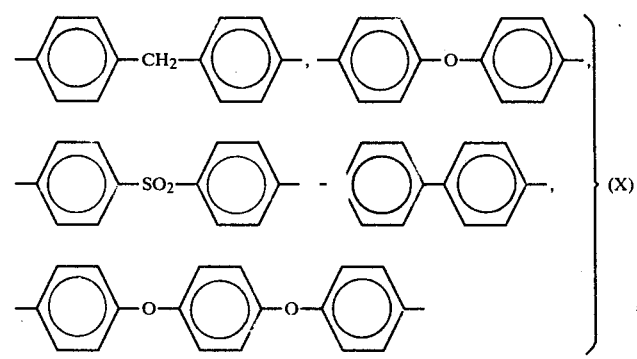
(X)
(XI)

-continued
Formula sheet

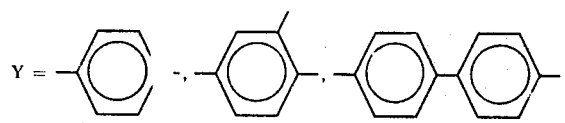

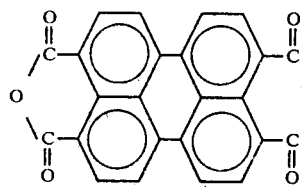
(XIII)

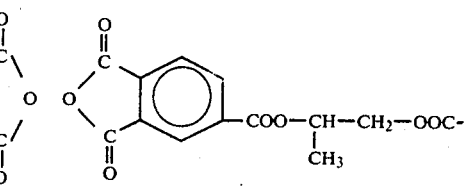
(XIV)

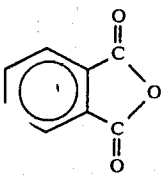

r = 1-8

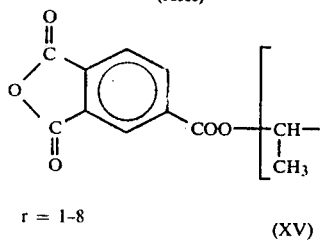
(XV)

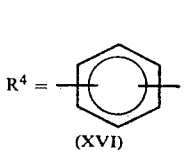
(XVI)

(XVII)

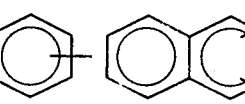
(XVIII)

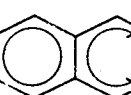
(XIX)

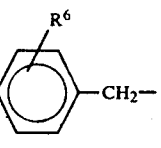

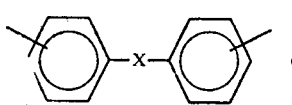
(XX)

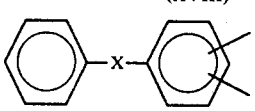
(XXI)

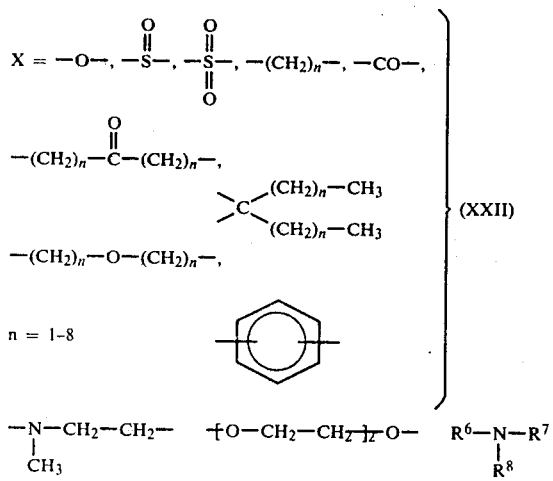

n = 1-8

—N—CH$_2$—CH$_2$—    $+$O—CH$_2$—CH$_2)_{\overline{n}}$O—    R$^6$—N—R$^7$
|                                                              |
CH$_3$                                                         R$^8$ (XXIII)        (XXIV)            (XXV)

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A water-soluble reactive binder, characterised by a combination of at least three of the components (a) at least one halogen-free polycarboxylic acid compound;
(b) at least on salt-forming substance selected from the group consisting of alkali metal, alkaline earth metal and quaternary ammonium salts, organic bases and ammonia;
(c) at least one component selected from the group consisting of
(c1) a polymer containing OH groups; and
(c2) an epoxide compound,
wherein the components (a) to (c2) are present as such or at least partially in chemically bonded form, which binder contains at least one reaction product of one of the formulae

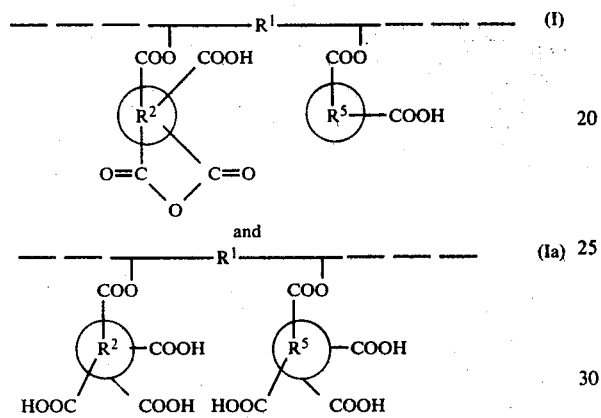

based on at least three of the components (a) to (c2), wherein $R^1$ represents a group derived from at least one component (c1) selected from the group consisting of (α) a polymer containing OH groups, in the form of (α1) polyesters, (α2) polymers, both with an OH number of 20 to 300, (α3) phenolic resins with an OH number of 100 to 800, and (c2) an epoxide compound;

$R^2$ represents a group derived from an at least tetrabasic carboxylic acid with a COOH group in the o-position relative to the ester group;

$R^5$ represents a group derived from an at least dibasic carboxylic acid with a COOH group in the o-position relative to the ester group, and $R^5$ may have the same meaning as $R^2$;

and the anhydride groups in formulae (I) and (Ia) are present as such or are at least partially replaced by at least one of the groups COOH and ester groups and the COOH groups are present as such or are replaced at least partially by ester groups, and wherein the free COOH groups are present in an amount of from 1 to 100% in the form of a salt of component (b).

2. A binder as claimed in claim 1 which is present in the form of an aqueous solution.

3. A binder as claimed in claim 1 also containing unreacted units of at least one of the components (a) to (c2), in addition to the reaction product of formula (I) or (Ia).

4. A binder as claimed in claim 3, also containing in addition to the reaction product (I) or (Ia), at least one of a substance selected from the group consisting of (i) a polycarboxylic acid, not bonded to a polymeric or condensation resin chain or to an epoxide compound, having a grouping according to one the formulae:

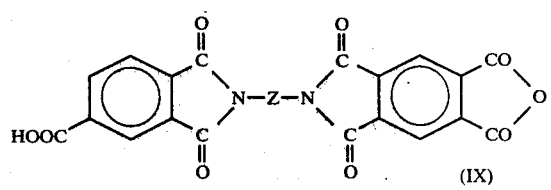

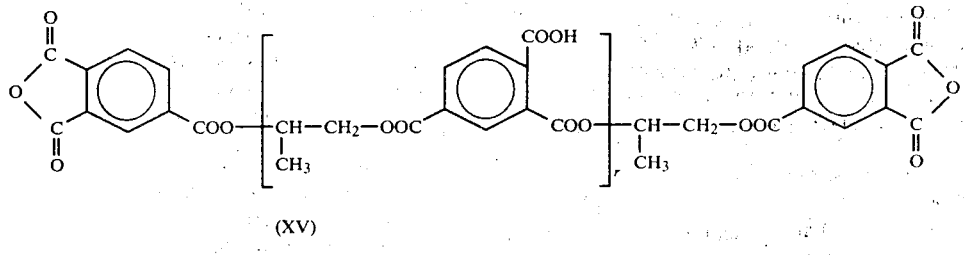

(XV)

but in at least partially hydrolysed form or at least partially in the form of a salt, and trimellitic acid;
- (ii) at least one thermosetting synthetic resin selected from the group consisting of melamine resins and urea resins in an amount of up to 30% by weight of the total solids content;
- (iii) at least one catalyst, in an amount of up to 5% by weight, based on the solids content; and
- (iv) an aqueous dispersion of at least one substance selected from the group consisting of a thermoplastic and its combination with at least on dispersion adjuvant, wherein in formulae IX and XI
Y represents a group of formula

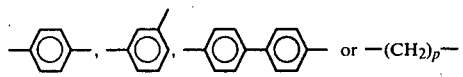 or $-(CH_2)_p-$ (in which p is from 2 to 8);
Z represents a group of formula $-(CH_2)_m-$ (in which m is from 2 to 8) or of formula

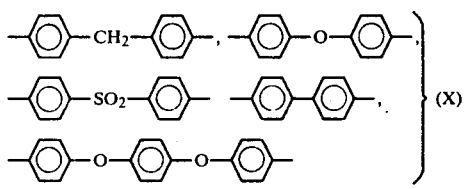 (X)

and
r is an integer from 1 to 8.

5. A process for the preparation of a binder as claimed in claim 1 wherein
- (a) at least one halogen-free polycarboxylic acid compound; and
- (b) at least one substance forming a salt with COOH groups selected from the group consisting of alkali metal and alkaline earth metal salts, quaternary ammonium salts, organic bases and ammonia are reacted simultaneously or in any desired sequence, in at least one step, with
- (c) at least one component from the grop consisting of
  - (c1) a polymer containing OH groups and
  - (c2) an epoxide compound, to form reaction products of one of the formulae (I) and (Ia), any anhydride groups present being hydrolysed at any desired stage of the process, but not later than the salt formation stage.

6. An article coated with a binder as claimed in claim 1.

7. An article as claimed in claim 6 wherein the coating has been hardened at a temperature from 0° to 350° C.

8. A water-dilutable adhesive containing (A) a binder as claimed in claim 1 and additionally containing an aqueous dispersion of at least one polymerization resin (B) selected from the group consisting of
- (B1) an unmodified elastomer, an elastomer at least partially modified with at least one of the groups COOH and sulphonic acid groups, and
- (B2) an acrylic copolymer, wherein the proportion of the reactive binder (A) is 5 to 40% by weight, and the proportion of component (B) is 60 to 95% by weight, both based on the total solids content.

9. An adhesive as claimed in claim 8 wherein component (B1) consists predominantly of a chlorobutadiene polymer which is unmodified or at least partially modified with COOH groups, and component (B2) consists predominantly of an acrylic copolymer, and wherein group $R^1$ in formula (I) or (Ia) is the group of a branched polyester based on at least one dicarboxylic acid, an aliphatic diol and an aliphatic triol, wherein the free COOH groups on at least one of the groups $R^2$ and $R^5$ are partially esterified with polyhydric alcohol and the remaining anhydride or COOH groups are present in the form of a quaternary ammonium compound and wherein the epoxide compound (c2) is present in the form of an epoxidised fatty acid ester.

10. A multi-layer article wherein at least 2 layers are bound together by an adhesive as claimed in claim 8 which has been solidified at a temperature between 60° and 110° C.

* * * * *